No. 615,639. Patented Dec. 6, 1898.
F. L. SIEGEL.
BOTTLE STOPPER.
(Application filed Nov. 22, 1897.)
(No Model.)

Witnesses

Inventor
F. L. Siegel
Attorney

UNITED STATES PATENT OFFICE.

FREDERICK LUDWIG SIEGEL, OF ATLANTA, GEORGIA.

BOTTLE-STOPPER.

SPECIFICATION forming part of Letters Patent No. 615,639, dated December 6, 1898.

Application filed November 22, 1897. Serial No. 659,450. (No model.)

*To all whom it may concern:*

Be it known that I, FREDERICK LUDWIG SIEGEL, of Atlanta, in the county of Fulton and State of Georgia, have invented certain new and useful Improvements in Bottle-Stoppers; and I do hereby declare the following to be a full, clear, and exact description of the invention, such as will enable others skilled in the art to which it appertains to make and use the same.

This invention contemplates certain new and useful improvements in bottle-stoppers.

In Letters Patent No. 581,523, issued to me April 27, 1897, I showed and described an improved stopper for preventing the surreptitious refilling of a bottle. The present improvement is specially designed for use in connection with the stopper mentioned, but yet may be employed independently thereof.

The object of the present invention is to provide extremely simple and inexpensive means for effectually closing the outlet of a bottle as against the inflow of liquid save when the bottle is inverted. This I accomplish by means of a globular body having a weighted and flattened surface. Ordinarily the surface of this spherical body will fit over and close the inner end of the bore of the casing in the bottle-neck; but when the bottle is inverted the body will turn on its bearings and present the flattened surface opposite to said bore, thereby leaving a passage-way for the outflow of the liquid.

The invention will be hereinafter fully set forth, and particularly pointed out in the claims.

Figure 1:
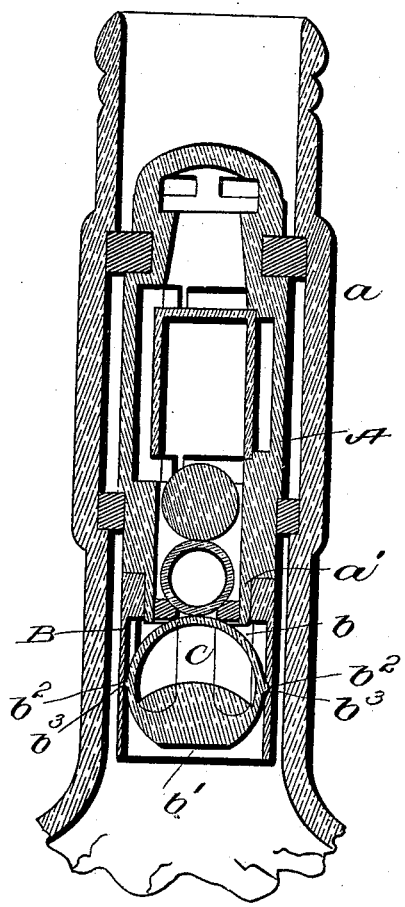
Figure 2:
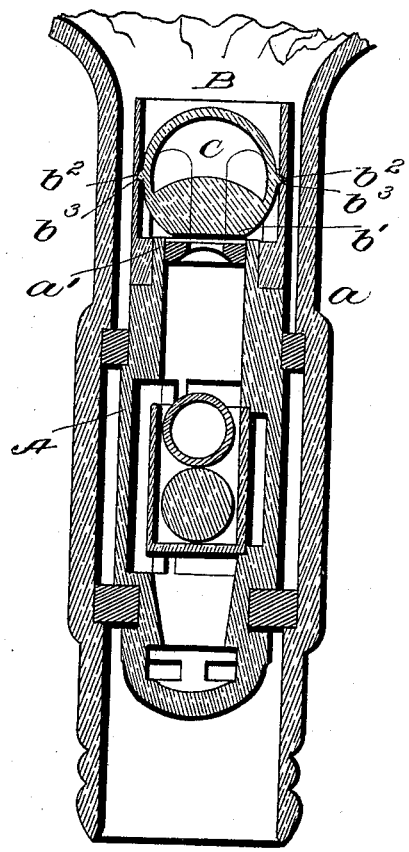
Figure 3:
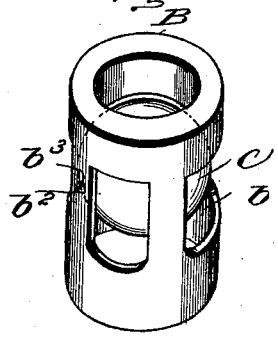

In the accompanying drawings, Figure 1 is a vertical longitudinal sectional view showing a portion of a bottle. Fig. 2 is a similar view, the bottle being inverted. Fig. 3 is an enlarged detail view.

Referring to the drawings, A designates a casing which is secured within the neck $a$ of a bottle. This casing is hollow and at its inner end $a'$ is exteriorly reduced in diameter. Within the casing may be located any suitable means for controlling the passage-way formed by the bore of the casing, such means being intended to prevent the surreptitious refilling of a bottle. This may be the means shown and described in my before-mentioned Letters Patent; but any other suitable means may be substituted.

B is a supplemental casing which is fitted on the inner reduced end $a'$ of casing A. It is open at its ends and is also preferably formed with a series of longitudinal openings $b$. Within this supplemental casing is located a valve C. This valve consists of a globular body which at one point on its surface is flattened, as at $b'$. This body is made one half solid or weighted and the other half hollow and is provided exteriorly with rounded lugs or trunnions $b^2$, which fit in grooves $b^3$ on the interior of casing B. These trunnions form the pivot-bearings for the globular valve-body, and the weighted portion of the latter tends to hold the valve constantly in one relative position—that is, with its weighted portion and flat surface downward. The uninterrupted contour of the valve-body fits over the inner end of the bore of the casing A, so as to practically close the same. This is so no matter what position the bottle is caused to occupy, save when it is completely inverted. Then the flattened surface is opposed to the inner end of the casing's bore and the liquid in the bottle is free to flow into casing A. As soon, however, as the bottle is moved out of the upright inverted position the valve-body will serve to close the bore of the casing. Hence it will be seen that the weighted valve-body effectually closes the casing's bore save when the bottle is inverted and held upright. When in this position, refilling the bottle is absolutely impossible, but an outlet for the liquid is provided. In any other position the curved surface of the globular valve-body will so fit over the inner end of the bore as to practically close the same.

The advantages of my invention are at once apparent. It will be seen that the same is inexpensive and not liable to readily get out of order. It will also be noted that the globular valve-body cannot be moved or controlled surreptitiously—as, for instance, by the use of a wire. While the parts may be made of any suitable material, yet I prefer to make them entirely of glass. I do not confine myself strictly to the construction and arrangement shown and described.

I claim as my invention—

1. A bottle having a casing in its neck formed with a central bore, and a globular body axially mounted within said casing and having a weighted portion normally beneath its axial bearings, said body having a segment of its surface normally projected into said bore and also having its weighted portion provided with a segmental flat surface, as set forth.

2. A bottle having a casing in its neck formed with a central bore and a globular body axially mounted within said casing and having a solid portion beneath its axial bearings, that portion of said body above said bearings being hollow and normally projected into said bore, said solid portion having an exterior flat surface centrally between the axial bearings of said body, as set forth.

3. A bottle having a casing in its neck, the inner end of said casing being reduced, a second casing fitted on said reduced end and having end and longitudinal openings, a globular body pivotally mounted in said second casing and weighted below its pivot-bearings, the apex of said weighted portion being flattened, substantially as set forth.

In testimony whereof I have signed this specification in the presence of two subscribing witnesses.

FREDERICK LUDWIG SIEGEL.

Witnesses:
WM. P. HILL,
J. F. O'NEILL.